(12) United States Patent
Davidson et al.

(10) Patent No.: US 7,076,349 B2
(45) Date of Patent: Jul. 11, 2006

(54) VEHICLE IDENTIFICATION MEANS DETECTION AND EVASION SYSTEM

(75) Inventors: Ron Yaacov Davidson, 5 Habroshim Street, 30900 Zichron Yaacov (IL); Nathaniel Davidson, Tel Aviv (IL)

(73) Assignee: Ron Yaacov Davidson, Zichron Yaacov (IL)

( * ) Notice: Subject to any disclaimer, the term of this patent is extended or adjusted under 35 U.S.C. 154(b) by 173 days.

(21) Appl. No.: 10/640,703

(22) Filed: Aug. 13, 2003

(65) Prior Publication Data

US 2004/0181328 A1    Sep. 16, 2004

Related U.S. Application Data

(60) Provisional application No. 60/404,450, filed on Aug. 19, 2002.

(51) Int. Cl.
*G06F 19/00*    (2006.01)

(52) U.S. Cl. .................. 701/36; 342/20; 340/425.5

(58) Field of Classification Search ............. 701/1, 701/36; 342/20, 104; 340/425.5, 936, 937, 340/988
See application file for complete search history.

(56) References Cited

U.S. PATENT DOCUMENTS

| | | | | |
|---|---|---|---|---|
| 4,949,088 A | * | 8/1990 | Ryan et al. | 342/20 |
| 4,956,930 A | * | 9/1990 | Troncoso | 40/209 |
| 5,510,793 A | * | 4/1996 | Gregg et al. | 342/20 |
| 5,819,198 A | * | 10/1998 | Peretz | 701/117 |
| 6,118,403 A | * | 9/2000 | Lang | 342/357.09 |
| 6,351,208 B1 | | 2/2002 | Kaszczak | |
| 6,400,304 B1 | * | 6/2002 | Chubbs, III | 342/20 |
| 6,675,085 B1 | * | 1/2004 | Straub | 701/93 |
| 2002/0022920 A1 | | 2/2002 | Straub | |
| 2003/0052797 A1 | * | 3/2003 | Rock et al. | 340/936 |

FOREIGN PATENT DOCUMENTS

| | | |
|---|---|---|
| EP | 0 789 344 A | 8/1997 |
| GB | 2 324 858 A1 | 11/1998 |
| GB | 2 353 650 A | 2/2001 |
| NL | 1 014 391 C | 2/2000 |
| WO | WO 01/55744 | 8/2001 |

OTHER PUBLICATIONS

PCT International Search Report: PCT/IL03/00672, mailed Oct. 31, 2003.

* cited by examiner

*Primary Examiner*—Gary Chin (57) ABSTRACT

A system for detecting and evading vehicle identification means (VIM), comprising: locating means, control means having a plurality of I/O channels, each adapted to receive or transmit serial or parallel data, processing means, electronic storage means comprising at least one database of known VIM coordinates and identification prevention device (IPD) adapted to automatically prevent identification of the vehicle's license plate number, owner or driver.

7 Claims, 10 Drawing Sheets

VEHICLE IDENTIFICATION MEANS DETECTION AND EVASION SYSTEM

CROSS-REFERENCE TO RELATED APPLICATIONS

The present application claims the benefit of the filing date of co-pending U.S. provisional application, S/N 60/404,450 filed Aug. 19, 2002, entitled "ACTIVE SPEED TRAP DETECTION AND EVASION SYSTEM".

FIELD OF THE INVENTION

The present invention relates to a system for automatically detecting vehicle identification means and operating identification prevention measures.

BACKGROUND OF THE INVENTION

Vehicle identification means are used around the world, mostly by law enforcement authorities and in conjunction with various kinds of law enforcement activities, such as, but not limited to speed-traps.

Existing speed-traps fall into two main categories: active speed-traps and passive speed-traps.

Active traps operate by transmitting a signal towards a traveling vehicle and measuring time delay, Doppler effect or other parameters to measure the speed of the vehicle. Active traps typically use radar or laser light for detection. Examples include Digital SMARTCAM, provided by Redflex, of Melbourne, Australia and Moltanova F-6 photo radars, provided by Multanova AG, Seestr. 110, CH-8610 Uster, www.multanova.ch, which record license plate numbers on film, and digital cameras, which store or transmit license plate numbers electronically. Active speed-traps may operate from fixed or mobile locations.

Passive traps operate by identifying a traveling vehicle in two positions and calculating the vehicle's speed using the known distance between the two positions and the time used by the vehicle to travel between them. Passive traps may also use film and/or digital cameras to capture the license plate number.

Other uses of vehicle identification means exist, which are not aimed at speed violations but at various other types of law violations, such as traversing in red light, not keeping an appropriate distance from the vehicle in front, etc. These VIMs use photographic means for capturing the license plate. Examples are MegaCar and CarFlow, available from MegaPixel, Russia.

A number of methods are known for locating a speed-trap. One such method uses an apparatus, such as an RF antenna, for detecting radar signals from a radar-operated speed trap and alerts the driver accordingly. There are several drawbacks to this method. First, the driver is only alerted once the radar beam from the speed trap is incident on his vehicle, which may be too late for reducing his speed. Second, the radar detector may be falsely set-off by devices other than speed-traps, which operate on similar frequencies.

Another method for detecting speed-traps, such as used by Photo-LIDAR, available from Ingram Technologies of Utah, USA, uses laser detectors to detect incident light from active speed-traps using laser light. Similar to radar detectors, the laser detector also alerts the driver only when a laser beam is incident on his vehicle and will not detect speed-traps using other detection methods.

An additional method for detecting speed-traps, which overcomes the shortcomings of the first two methods, uses a combination of a speed-trap location database and a Global Positioning System (GPS) to alert the driver that he is approaching a speed-trap. Various systems of this type are described, for example, in International Published Application WO 01/55744 and in UK Published Applications UK 2353647 and UK 2353650. Existing products using this method include Geodesy GPS SpeedTrap Location System, manufactured by Morpheous, UK, and GPS Warning System available from Origin blue I, UK.

All the above disclosures and products use an updateable database of speed-trap location coordinates, get continuous location readings from the GPS and alert the driver, by various means such as voice alert, beep alert or displayed warning, when he is within a certain range of a speed-trap. The disclosed devices may also determine whether the vehicle is moving in the direction of the speed-trap and only issue an alert if this is the case.

For all the detection and alert systems described above to be effective, the driver is expected to stay alert to the warning signal and reduce his speed accordingly when the signal has been issued. This requires the driver to divide some of his attention from the road. The driver may be tired, or in the middle of a conversation, and not pay attention to the warning signal.

Various active counter-measures for evading speed traps exist in the marketplace, including means for detecting and/or jamming radar signals, in order to avoid detection. The jamming devices, such as the Phantom Radar Jammer, manufactured by Galaxy Descramblers of Illinois, USA, receive the radar gun's signal and piggyback it with noise, so that the signal going back to the radar gun is not recognized by the computer.

Other existing means deal with obscuring the vehicle's license plate from the photo-radar camera. These products, such as the Protector, manufactured by On-Track Manufacturing Corp. of Blaine, Wash., use especially designed license plate covers, comprising a micro-prismatic lens, which bends light like a prism when viewed from a 35° angle. This effect makes the cover reflect the incoming light from the camera's flash, when impinging at 350 horizontally or vertically, with an additional configuration that combines partial horizontal and vertical reflection. The cover looks transparent when viewed from directly behind (or in front of) the vehicle. The effective protection of these products is limited by the narrow angle of protection.

Another product, manufactured by Chimera of New Haven, Conn., provides a different type of micro-prismatic lens, designed to reflect incoming light starting at a pre-defined angle of 45° and covering the entire range from the starting angle to 180°. The drawback of this type of lens is that it is visible from various angles.

U.S. Pat. No. 4,956,930 to Troncoso describes a license plate cover provided with vanes, designed to obscure viewing of the plate identification from the side.

The drawback of all these counter-measure devices lies in their non-selective use. The measures are permanently operational and thus place the driver in permanent danger of being apprehended.

Published U.S. patent application Ser. No. 2002/0022920 provides a system including a positional sensor such as a GPS device. Position information is used to access a database of speed limit and/or speed trap information. Speed limit information is used to control the speed of the automobile as part of a cruise control operation and/or is used to provide the motor vehicle operator with warnings.

There is need for an active, universal law enforcement vehicle trap detection system that will be effective against all types of vehicle law enforcement traps and will automatically, upon detecting approach to a trap, operate identification prevention measures to avoid detection of the vehicle or the driver, without the need for the driver to be alert and without reducing the vehicle's cruising speed, and automatically deactivate the identification prevention measures when the vehicle is out of the detection zone.

SUMMARY OF THE INVENTION

According to one aspect of the present invention there is provided a system for detecting and evading vehicle identification means (VIM), comprising:
  locating means;
  control means connected with said locating means, said control means having a plurality of I/O channels, each said I/O channels adapted to receive or transmit one of serial data and parallel data;
  processing means connected with said control means;
  electronic storage means connected with said processing means, said electronic storage means comprising at least one database of known VIM coordinates; and
  at least one identification prevention device (IPD) connected with said control means, said IPD adapted to prevent identification of at least one of said vehicle's license plate number, said vehicle's owner and said vehicle driver.
  said control means adapted to automatically enable and disable at least one of said at least one IPD.

The location means may comprise an antenna and a GPS receiver/decoder.

The location means may alternatively comprise a cellular locating device.

The system may additionally comprise at least one VIM detector, and optionally a single-wire communication channel between said control means and said at least one VIM detector, said single-wire communication channel adapted to enable fast deployment of at least one of said IPDs.

The serial data channels may comprise RS232 channels.

The parallel data channels may comprise USB channels.

The processing means may comprise a PDA.

The at least one database may comprise a plurality of databases, each said databases comprising VIM coordinates for a predefined VIM type.

The predefined VIM type may be selected from the group comprising: speed traps, red-light traps, stop-sign traps and inter-vehicle distance traps.

The database may additionally comprise auxiliary coordinates.

The IPD may comprise one of a license plate cover, an ID-sticker cover and passenger concealing means.

The IPD may comprise one of the group comprising light-scattering LCD glass, polarization LCD glass and electrochromic glass.

The IPD may comprise a license-plate flipper.

In another aspect of the present invention there is provided a method of detecting and evading vehicle identification means (VIM), comprising the steps of:
  providing a VIM detection and evasion system, comprising:
  locating means;
  control means connected with said locating means, said control means having a plurality of I/O channels, each said I/O channels adapted to receive or transmit one of serial data and parallel data;
  processing means connected with said control means;
  electronic storage means connected with said processing means, said electronic storage means comprising at least one database of known VIM coordinates; and
  at least one identification prevention device (IPD) connected with said control means, said IPD adapted to prevent identification of at least one of said vehicle's license plate number, said vehicle's owner and said vehicle's driver,
  said control means adapted to automatically enable and disable at least one of said at least one IPD;
  reading current location indication from said locating means;
  comparing said current location indication with at least part of said VIM coordinates in said at least one database; and
  automatically operating, based on said step of comparing, at least one of said at least one IPD.

The method may additionally comprise, following said step of operating, the steps of:
  reading current location indication from said locating means;
  comparing said current location indication with at least part of said VIM coordinates in said at least one database; and
  automatically disabling, based on said second step of comparing, said at least one of said at least one IPD.

The locating means may comprise an antenna and a GPS receiver/decoder.

The locating means may comprise a cellular locating device.

The at least one database may comprise a plurality of databases, each said databases comprising VIM coordinates for a predefined VIM type.

The predefined VIM type may be selected from the group comprising: speed traps, red-light traps, stop-sign traps and inter-vehicle distance traps.

The database may additionally comprise auxiliary coordinates.

The step of comparing may additionally comprise the step of comparing said current location indication with at least part of said auxiliary coordinates.

The step of operating said IPD may comprise the steps of:
  receiving a command comprising said IPD's address from said processing device; and
  sending an ON signal to said addressed IPD.

The VIM detection and evasion system may additionally comprise at least one VIM detector.

The step of operating said IPD may comprise the steps of:
  receiving a VIM identification signal from one of said at least one VIM detectors;
  communicating said signal to said processing means;
  receiving a command from said processing device for activating one of said at least one IPD; and
  sending an ON signal to said IPD.

The step of operating said IPD may comprise the steps of:
  receiving a VIM identification signal from one of said at least one VIM detectors; and
  sending an ON signal to a predefined one of said at least one IPD.

The at least one IPD may comprise at least one of a license-plate cover and an ID sticker cover.

The IPD may comprise a license-plate flipper.

In yet another aspect of the present invention there is provided a license-plate flipping device for flipping a vehicle's license plate 180 degrees around a horizontal or vertical pivot axis, wherein the distance of said pivot axis from said vehicle's body is less than half said license-plate's size in the dimension orthogonal to said pivot axis, and wherein no changes are made to said vehicle's body for the purpose of mounting said flipping device thereto.

The license-plate flipping device of may comprise:
- a power source;
- a panel attached to said license-plate along the back thereof;
- two gear motors having respective shafts, said shafts respectively connected with said panel on said panel's two horizontal sides;
- two arms connected respectively at one end thereof with said two motor shafts;
- two beams connected respectively to the other end of said two arms;
- a rod spanning said two beams parallel to the longitudinal axis of said license-plate;
- two torque springs, each respectively mounted between one of said arms and one of said beams;
- two micro-switches attached to one of said motor shafts; and
- a leaf spring adapted to alternately exert force on each of said micro-switches.

BRIEF DESCRIPTION OF THE DRAWINGS

FIG. 10 is an electric scheme of a voltage converter according to the present invention.

DETAILED DESCRIPTION OF PREFERRED EMBODIMENTS

In the following detailed description, numerous specific details are set forth regarding the system and method and the environment in which the system and method may operate, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention. Moreover, various examples are provided to explain the operation of the present invention. It should be understood that these examples are exemplary. It is contemplated that there are other methods and systems that are within the scope of the present invention. Also, the same reference numerals are used in the drawings and in the description to refer to the same elements to simplify the description.

The system of the present invention is an active vehicle identification means (VIM) detection and evasion system for automatically activating identification prevention devices (IPD) when it is determined that the vehicle is approaching an identifying means and subsequently de-activating the same IPD according to pre-determined criteria. The system thus frees the driver from the need to be alert to any audio/visual warning signals and slow his traveling speed accordingly, and shortens the timeframe of active IPD operation to the necessary minimum. The system also enables the driver to drive freely through toll-roads, without the danger of being identified. In another application, the system of the present invention may contribute to privacy requirements, whether by political or other national bodies or by private citizens wishing to prevent others from knowing their whereabouts. The IPDs used in conjunction with the present invention may prevent identification of the vehicle's license plate or of the vehicle's owner or driver, such as an ID sticker, or the identification of any part or passenger of the vehicle.

Figure 1:
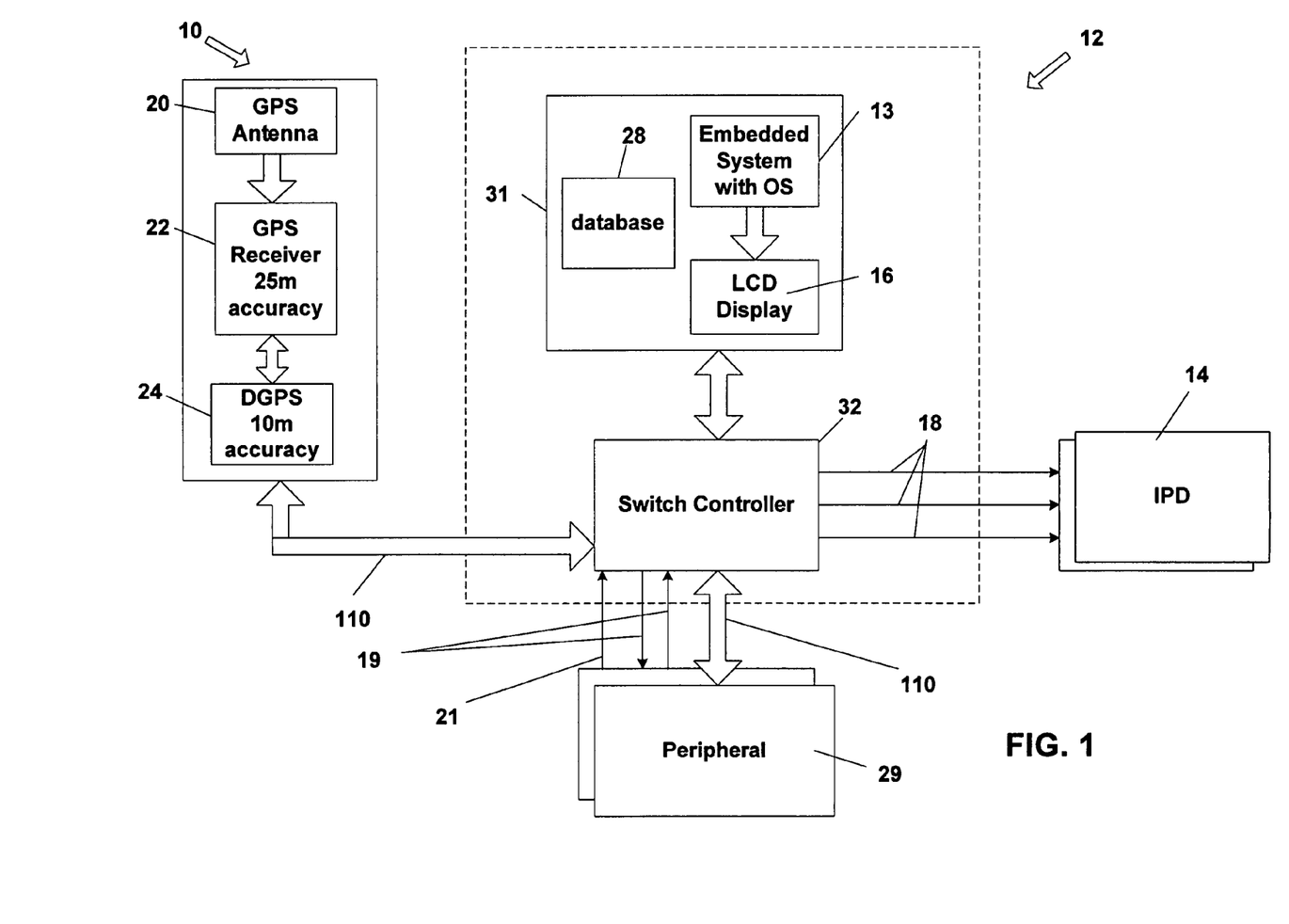
FIG. 1 is a schematic block diagram of the system of the present invention.

FIG. 1 is a schematic block diagram of the system of the present invention. The main functional blocks of the system are a locating system, generally denoted by numeral 10, a control and processing unit, generally denoted by the numeral 12, and one or more IPDs, generally denoted by numeral 14. The control and processing unit 12 comprises an embedded system 13, capable of supporting an Operating System (WinCE, PalmOS, Linux, DOS etc.). The embedded system 13, together with a display 16, is preferably implemented with a PDA device 31. The control and processing unit 12 additionally comprises a switch controller 32, designed for regulating and switching I/O communication between embedded system 13, locating system 10 and other peripherals 29, as will be described in detail hereinbelow. Switch controller 32 is also responsible for controlling On/Off signals to IPDs 14. Communication cables, such as a 25-pin cables (110) connect the locating system 10, each peripherals 29 and the PDA 31 with the switch controller 32. These system components communicate over the e.g. 25-pin cables in RS232 and/or USB protocols.

The locating system 10 comprises an antenna 20, for receiving signals from GPS (Global Positioning System) satellites, and a GPS receiver/decoder 22. The GPS receiver/decoder and the antenna are standard devices, such as Saphire GPS mouse from Royatek at www.royaltek.com (with RS232 cable) or GPS25-LVC and GPS36 TracPak, respectively, both available from Garmin Ltd., Kansas City, USA. The GPS receiver/decoder processes the received GPS signals and outputs a data stream that defines the current position of the vehicle. The accuracy of the GPS receiver/decoder is in the range of 25 m. Optionally, locating system 10 may also comprise a correction module 24, such as DGPS Invicta 210L, available from Dtarlink Inc., Austin, Tex., USA, whereby the detection accuracy is improved to about 10 m.

In another preferred embodiment of the present invention, cellular location devices, such as CDMA cell sites may be used for location determination, instead of the GPS receiver/decoder 22, or a hybrid device, such as gpsOne, available from Qualcomm Inc., California, which provides highly accurate positioning by combining signals from GPS satellites and wireless networks. All references hereinbelow to GPS are made by way of an example and may be replaced by any other locating or positioning device.

The control and processing unit 12 additionally comprises a speed-trap coordinates database 28 and optionally additional databases related to other law-enforcement trap locations. Alternatively, database 28 may include, in a single database, coordinates for various types of traps other than speed traps. All references to speed-trap coordinates databases 28 below should be read as referring to the various types of VIM coordinates.

IPD 14 may comprise various devices designed at preventing identification of the vehicle and/or the vehicle's owner or driver such as, but not limited to:

- a license-plate flipping mechanism, as will be described in detail hereinbelow
- a license-plate/ID sticker cover comprising standard light scattering LCD (dispersed polymer) normally opaque or partially opaque, that becomes transparent when a current with sufficient voltage is applied, available from Laminated-Technologies (http://www.laminatedtechnologies.com)
- Polarization (twisted pneumatic) LCD glass (by Opterl at www.optrel.com) that is normally transparent and becomes dark when sufficient voltage/current is applied
- Electrochromic glass (SAGE Electrocromichs of Faribault, Minn.) that becomes dark when sufficient voltage/current is applied.

One or more wires 18 connect the control and processing unit 12 to the IPDs 14, to allow for selective deployment of the IPDs to the front and/or back license plates, according to pre-programmed criteria, as will be explained in detail below.

Other peripherals, generally denoted by numeral 29, may be connected with the switch controller 32 with one or more communication protocols, such as RS232, USB, Fire-wire etc. Peripherals 29 may comprise various devices capable of sending/receiving information about threats to/from the switch controller 32 and the PDA 31. For example, peripheral 29 may comprise a "blinder" laser speed-trap countermeasure (www.blinder.dk). Upon detection by the "blinder" of an active speed-trap, the "blinder" sends an interrupt to the switch controller 32, requesting communication with the PDA, for communicating to the PDA details about the detected speed-trap, such as type, distance etc. Alternatively, peripheral 29 may comprise a multi-band, multi-frequency signal detection device as described in PCT Publication No. WO 03/034087. Peripheral 29 may comprise one or more devices or combination of devices such as described above or any other laser, radar, speed-trap, inter-car distance detectors, red light detectors, toll road identification means, or any other vehicle identification means (VIM). In another embodiment, peripheral 29 may be directed at identifying a special type of VIM, such as the Marom Traffic Law Enforcement System available from Elbit of Haifa, Israel. The system uses electro-optic and infra-red technologies. The automated, lane-based traffic system measures speed and distance between vehicles traveling in a given lane. Every vehicle passing between the electro-optic head and retro-reflectors breaks the two beams and triggers computer to measure speed, acceleration, headway and vehicle length If any vehicle exceeds any present parameters the high resolution digital cameras photograph front and rear of vehicle, and all violation data are stored on digital audio tapes. In order to detect the two-infrared-beams device, a photo-diode capable of detecting the required bandwidth (e.g. 820 to 880 nm) such as High-Sensitivity GaAIAs Photodiode ODD-45W/95W, available from Opto Diode, Corp., California, may be installed on the vehicle, preferably at the front. The photo-diode will be connected with the switch controller 32 via a communication channel 21 as will be described hereinbelow.

Peripheral 29 may have an additional communication channel 21 with switch controller 32, for transmitting discrete input signals, to enable fast on/off operation of an IPD, with or without involving the PDA 31 and possibly while the peripheral 29 is not in direct communication with the PDA. This immediate "emergency" communication causes the switch control to initiate a timer, for a predefined period in which the IPD will be operated. The timer uses low frequency clock 540. This mode enables fast operation of IPD until the peripheral is able to communicate with the PDA. At this point control goes to the PDA, for deciding whether the IPD should be operated, according to the logic described below. Peripheral 29 synchronizes its communication with switch controller 32 by using two single-wire communication lines 19, for sending 'request-to-send' signals and receiving 'clear to send' signals.

Trap coordinates database 28 preferably stores coordinates of all the fixed traps in a relevant area, such as a country, a state, or a part thereof. The coordinates may be downloaded from existing databases on the Internet. The database may also be manually updated by the user, using the PDA, through a user interface that allows him to enter coordinates of newly discovered VIM, or any other object of interest. The user may also press a designated button when driving by a "new" VIM, not registered in the database; the system will store this new coordinate along with all other coordinates needed for calculating when the IPDs should be activated/de-activated. New coordinates may also be updated by connection of the PDA (including database) to the Internet. Upon connection to the Internet, the "new" coordinates collected and stored may be relayed to the "manufacturer's" database for future updates.

Trap coordinates database 28 preferably also stores, for each stored coordinate, N supplementary coordinates representing N sequential locations the vehicle should travel by if it is headed towards that specific VIM. The car does not have to pass directly over the coordinate but rather, pass within a predefined radius of the coordinate, whether principal or auxiliary. When "new" coordinates are manually added during driving, the supplementary coordinates are also added by the system from a constantly updated "recent history" database.

In one preferred embodiment of the present invention, speed trap database 28 may additionally store "out of range" coordinates, for disabling the IPD once the vehicle has passed the VIM and is out of range of detection.

Figure 2:
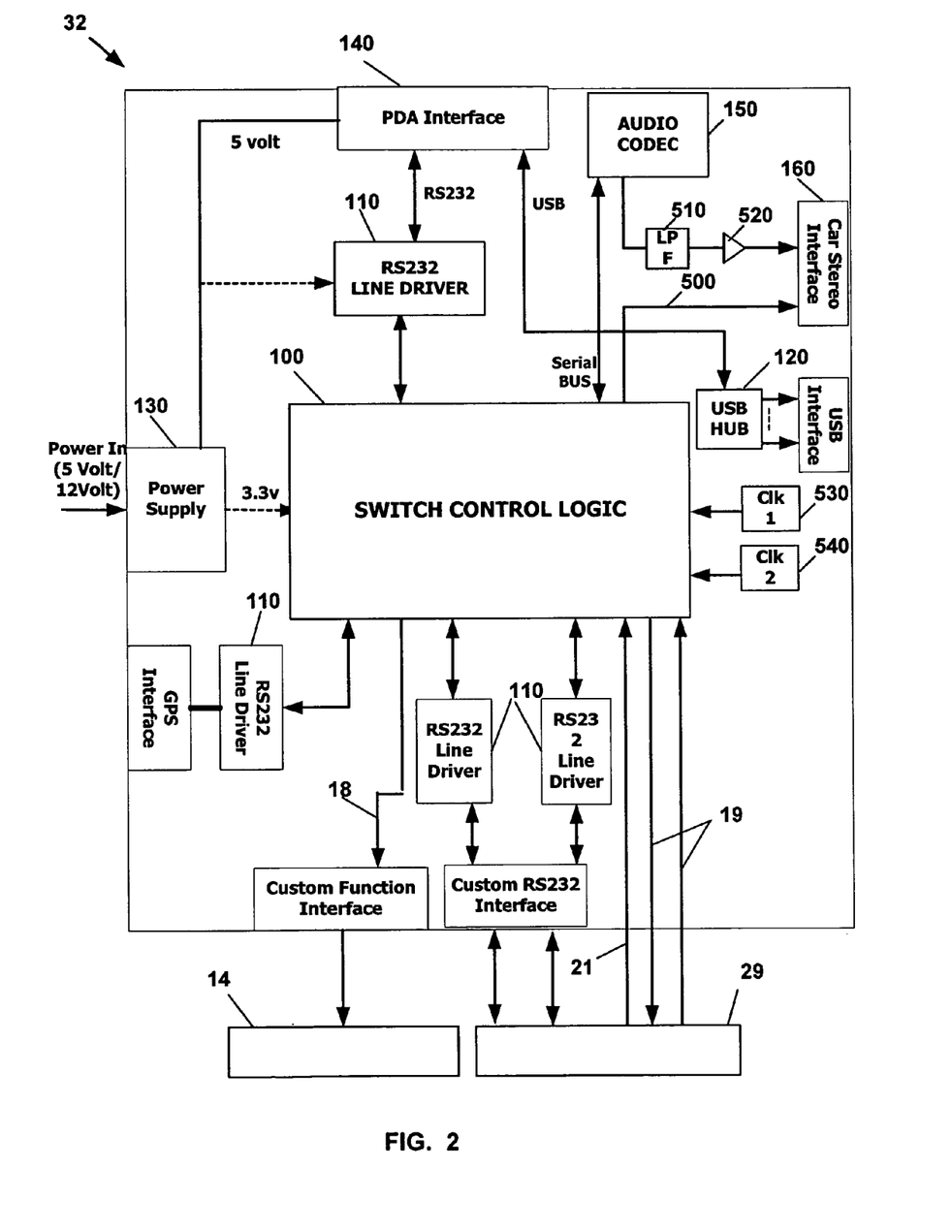
FIG. 2 is a schematic block diagram of the switch controller according to a preferred embodiment of the present invention.

FIG. 2 is a block diagram of switch controller 32 according to a preferred embodiment of the present invention, comprising:

- switch control logic 100, a programmable logic device such as Altera EPM7032/EPM7064 or Altera Cyclon3kXXX. The switch control logic 100 comprises a hardware logic-gate implementation of all logic functions for which the switch control is responsible. Amongst others, it comprises an implementation of a logic MUX function used to set the RS232 communication channel between the PDA 31 and GPS/peripheral.
- a plurality of RS232 line drivers 110, connecting the switch control logic 100 with peripherals 29 and with the GPS receiver/decoder 22, for converting RS232 signals to TTL level signals;
- a USB hub module 120, such as TUSB2046B by TI, connected directly with the PDA USB port, for enabling concurrent communication with a plurality of USB peripherals and with the USB port of the PDA 31;

a plurality of discrete on/off output connections 18, for single-wire fast communication to IPDs 14;

a DC-to-DC power supply unit 130, connected with the vehicle's power supply directly or by a 12V to 5V converter, such as A-6017-xxx Cigarette Adapter Cable by Rikaline at www.rikaline.com for converting from 5V/12V to 3.3V;

a PDA interface connector 140, such as serial-port, infrared, SDIO, CFIO, custom sleeve or any other suitable interface known in the art; and A high frequency clock 530 and a low frequency clock 540. The low frequency clock 540 is used for counting seconds.

For the purpose of enhancing audio alerts initiated by the PDA 31, switch controller 32 may additionally comprise a dedicated discrete signal 500 from switch control logic 100 directly to the mute signal of the car's stereo (not shown). Signal 500 should comply with the standard mute-signal voltage. In a second embodiment, discrete signal 500 may be connected with radio switch 160, such as Audio Call, by Vega Elettronica, Madrid, Spain. This second embodiment may additionally comprise connecting the PDA 31 earphone outlet, via a voltage/current amplifier, to radio switch 160 (not shown). In a third embodiment, the PDA 31 may send a digital audio signal to switch control logic 100. Switch control logic 100 communicates the signal to an audio codec 150, in which the signal is translated to an analog signal, which then passes through low-pass filter 510 and amplifier 520 to radio switch 160. The radio switch 160 is usually used for hands-free mobile phone speaker.

The control logic 100 and the PDA 31 software communicate using a custom communication protocol that enables more than one RS232 channel to be connected to the PDA, by switching between the different channels, as will be described below, in conjunction with FIG. 3.

Figure 3:
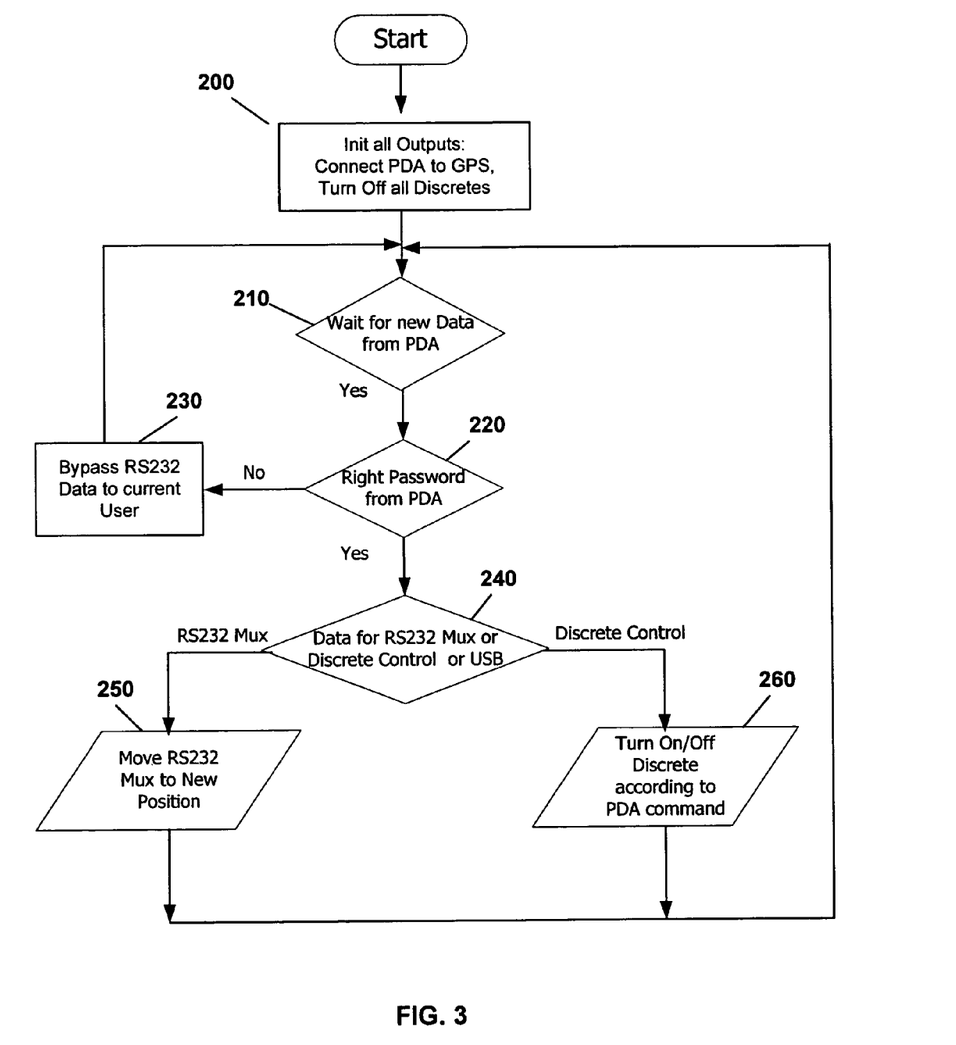
FIG. 3 is a flowchart describing the hardware logic of the PDA transmit request according to a preferred embodiment of the present invention.

FIG. 3 is a flowchart describing the hardware logic of the PDA 31 transmit request to the switch controller 32. In step 200, system initialization, the PDA 31 is connected to the location unit 10 and all discrete channels 18 are turned Off. In step 210, the switch control logic 100 enters a waiting loop for new data from the PDA 31. When data is received, a "password" verification takes place (step 220). If the password test fails, the current RS232 channel is ignored in step 230 and the system loops back to step 210 to wait for another communication. If the password test is successful, switch control logic 100 parses a second command, in step 240, to identify the unit to be communicated. If the data is for the RS232 MUX, the switch controller moves the MUX to a different peripheral, as indicated, in step 250, to enable communication to the designated peripheral, e.g. enabling/disabling the peripheral according to predefined criteria. Alternatively, if the data indicates a discrete control (step 260), the indicated IPD is turned On/Off according to the command received.

Figure 4:
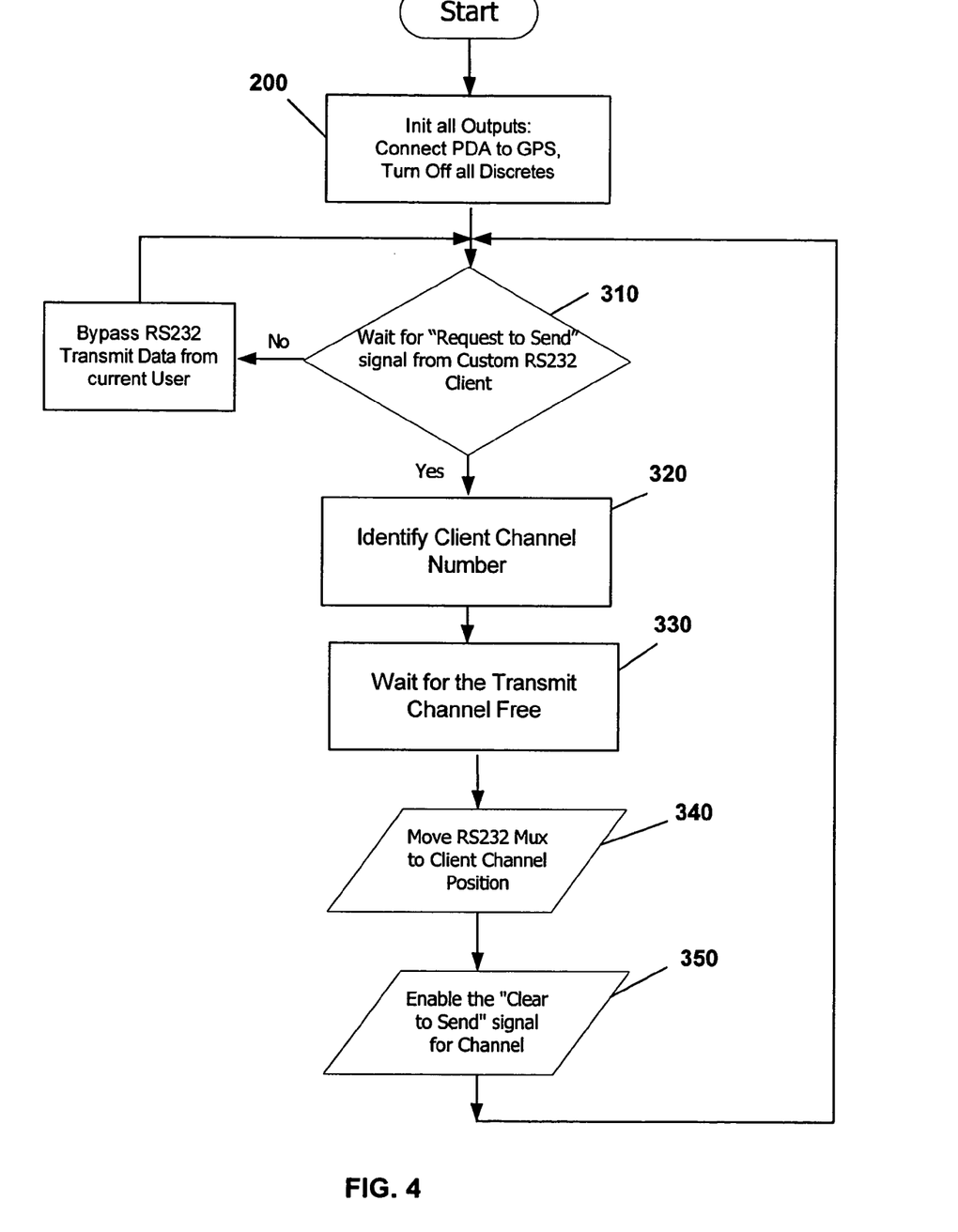
FIG. 4 is a flowchart describing the hardware logic of a peripheral 29 transmit request to the switch controller 32.

FIG. 4 is a flowchart describing the hardware logic of a peripheral 29 transmit request to the switch controller 32. In step 200 (identical to step 200 of FIG. 3), system initialization, the PDA 31 is connected to the location unit 10 and all discrete channels 18 are turned Off. In step 310, the switch control logic 100 enters a waiting loop for a Request-to-Send signal from a peripheral 29. When a Request-to-Send signal is received, the switch control logic 100 identifies the requesting channel, in step 320 and waits until the channel is free to transmit, in step 330. The switch control logic then redirects the RS232 MUX to the requesting channel position (step 340) and sends the channel a Clear-to-Send signal (step 350).

The sequence of operation of the active vehicle identification means detection and evasion system of the present invention will now be described with reference to the general flowchart of FIG. 5. The system operation is described with an exemplary mode of speed-trap detection and evasion. At system startup, the Switch Controller first runs through an Init Test, in step 34, to assure its operability, followed by a GPS connection test, in step 36. Having established that the system is in working condition, the regular operation of the system is started, in step 38, by getting a current GPS position reading. In step 40 the current GPS reading is compared with the database entries to determine whether the vehicle is approaching a trap (step 42). If the test of step 42 determines that the vehicle is not approaching a trap, the system checks, in step 44, whether the vehicle has recently passed a trap. If it hasn't—the system loops back to step 38 to get the next GPS position; if it has—the system checks, in step 46, whether the IPD is disabled and loops back to step 38 if it is. If the IPD is enabled, the system disables it before looping back to step 38. If it has been determined in step 42 that the vehicle is approaching a trap, the system checks whether the IPD is enabled, in step 50. If it is—the system loops back to step 38 and if it isn't—the system enables it in step 52 before looping back to step 38.

If more than one IPD 14 is available, an automatic selection of the IPD to be activated may be performed by the system, according to any predefined criterion such as the time of day, the geographical area, etc.

The logic applied in steps 42 and 44 of FIG. 5, for determining whether the vehicle is approaching a trap or has passed a trap's detection area will now be explained with reference to the flowchart of FIGS. 6A and 6B. As mentioned above, speed trap coordinates database 28 stores, with reference to each trap coordinate, a sequence of auxiliary coordinates through which the vehicle must pass on its way to the trap.

Figure 5:
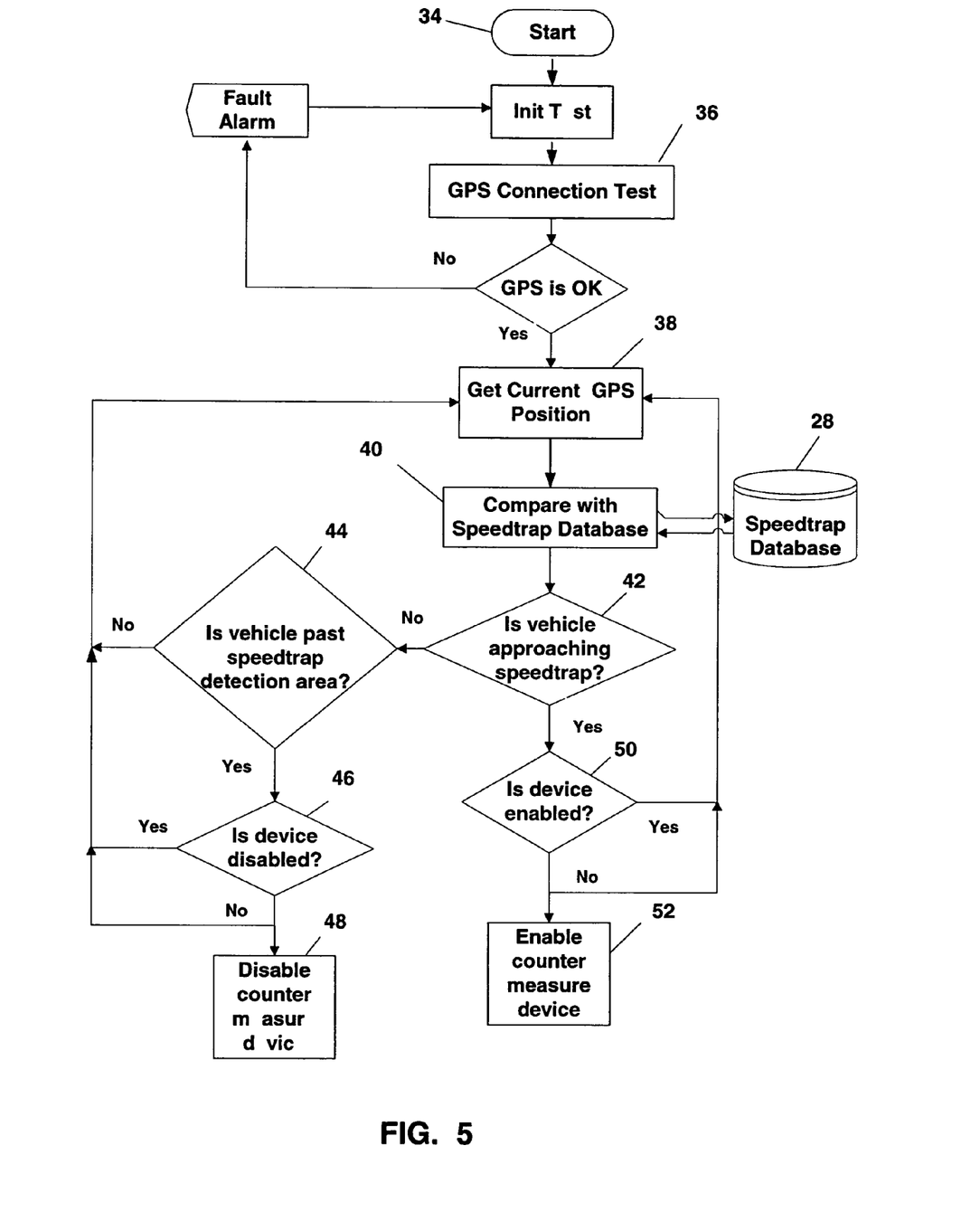
FIG. 5 is a general flow-chart describing the method of the present invention.
Figure 6A:
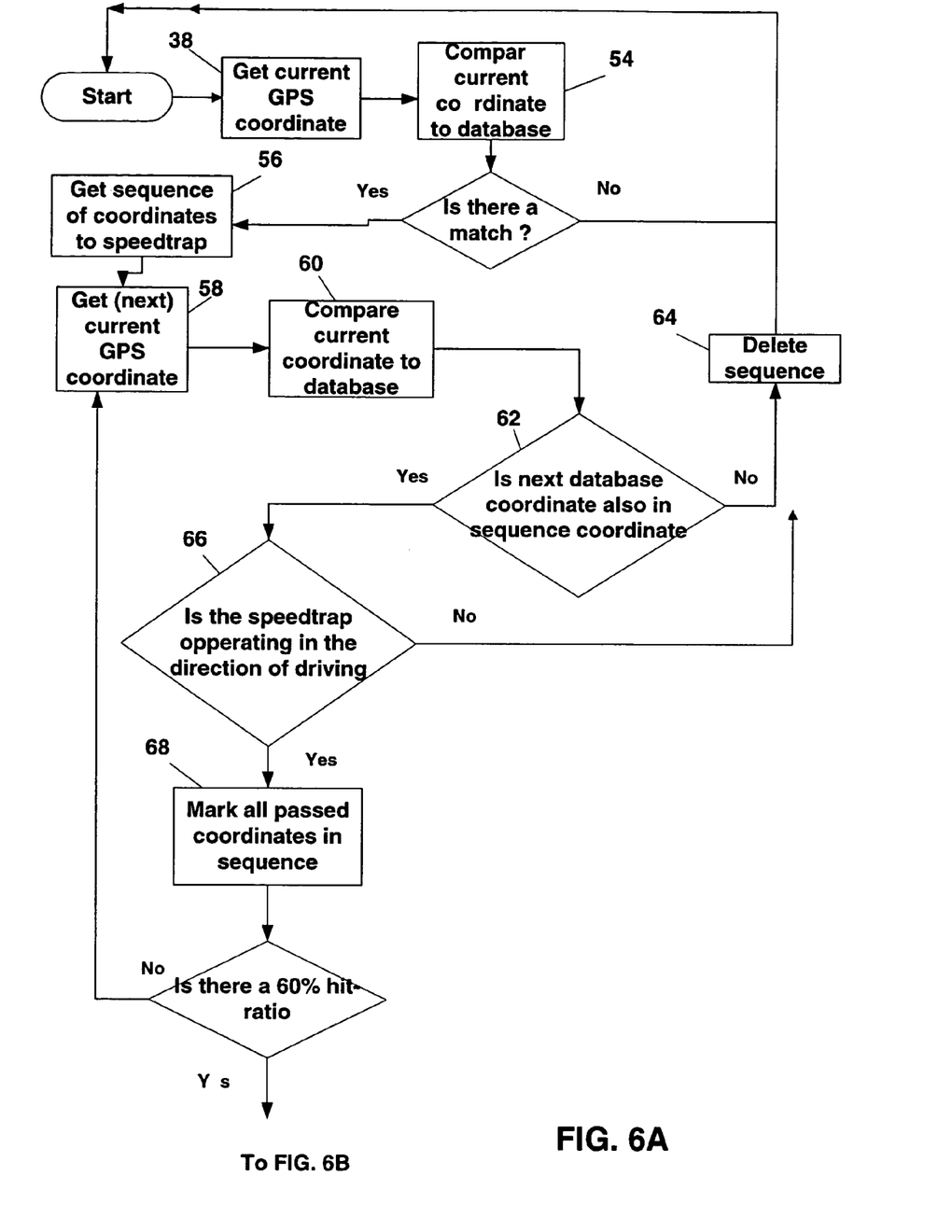
FIGS. 6A and 6B are detailed flow-charts describing the method of the present invention.

In step 38 of FIG. 6A, which is equivalent to step 38 of FIG. 5, a current GPS location is read. Next, the database is searched, in step 54, for a coordinate match. If no match is found, the system loops back to step 38 to get the next GPS coordinate. If a match is found, the system enters an "Approach" mode, in which it will now try to determine whether the vehicle is approaching the trap associated with the matched auxiliary coordinate. In step 56, the entire sequence of auxiliary coordinates, or a first part thereof, is loaded into the PDA memory. The system now gets the next GPS coordinate, in step 58. Again, the database is searched, in step 60, for a coordinate match. If no match is found, the system loops back to step 58, to wait for the next GPS coordinate. If the current coordinate is found in the database, the auxiliary coordinates sequence stored in memory is searched for a match, in step 62, to find out if the vehicle is following the sequence leading to the associated trap. If no match is found in the stored auxiliary coordinates sequence, the sequence is deleted from memory, in step 64 and the system loops back to step 38, to get the next GPS coordinate. The fact that no second match was found in the auxiliary coordinates sequence can be explained either by the fact that the driver has changed course and is no longer heading towards the associated trap, or by a GPS reading fault. In step 66, the order of meeting the matched auxiliary coordinates in the sequence is checked to make sure that the vehicle is traveling in the direction of the trap. If it is not, meaning that the matched auxiliary coordinates have not been met in the correct order, the system determines that the stored auxiliary coordinates sequence is not relevant, deletes it in step 64 and loops back to step 38 to get the next GPS coordinate. Otherwise, if the order of the sequence is held, the currently matched coordinate is marked and a test is made, in step 68, to check if a predetermined percent (hit-ratio), say 60% of the auxiliary coordinates in the sequence have been matched. If the hit-ratio has not been met, the system goes back to step 58 to get the next GPS coordinates. Otherwise, a determination is made that the vehicle is approaching the associated trap. The required hit-ratio being less than 100% takes care of positive detection in cases where an auxiliary coordinate has not been detected, possibly due to GPS error.

It will be appreciated by any person skilled in the art that the example of a speed-trap in FIGS. 5 and 6 is not limiting, and could apply to any Vehicle Identification Means (VIM) as described above.

Figure 6B:
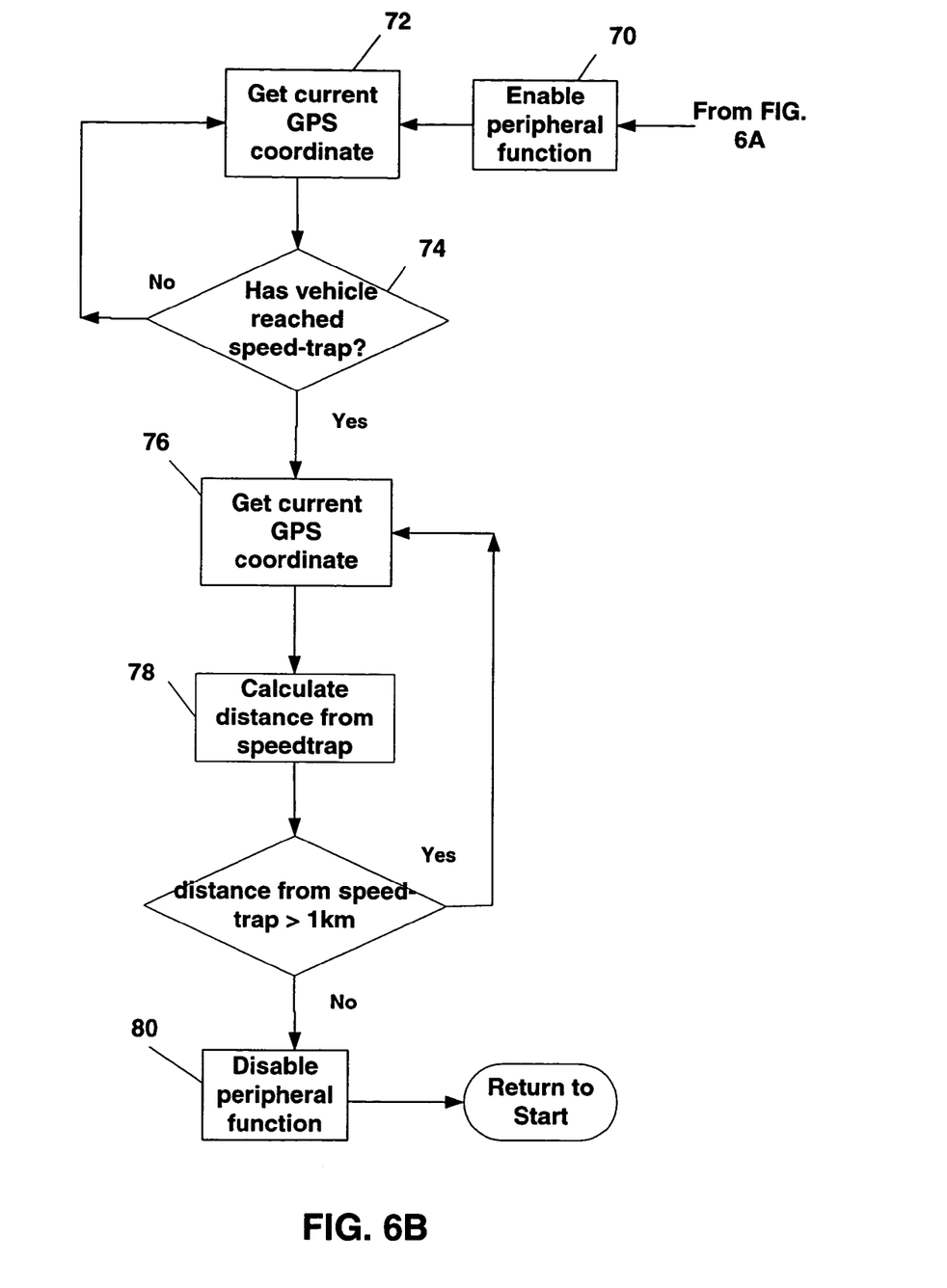

Attention is drawn now to FIG. 6B. When the system has affirmed that the vehicle is approaching the now identified trap, the switch controller 32 enables one or more IPDs (14), in step 70. In a preferred embodiment of the present invention, the speed trap database 28 stores additional information for each trap, such as its detection range, so that the enabling of the IPD(s) can be done timely, based on the vehicle's current coordinate and speed.

When the IPD has been enabled, the system enters a "Lock" mode, in which GPS coordinates are read, in step 72 and compared with the actual trap's coordinate, in step 74, until a match is found, meaning that the vehicle has reached the trap.

The system now enters a "Depart" mode, to determine when the IPD may be turned off. The determination may be made based on a second set of auxiliary coordinates stored in the database, indicating departure from the trap. Alternatively, the stored detection range of the trap may be used to determine when the IPD may be turned off, based on the vehicle's current coordinate and speed. In the embodiment of FIG. 6B, current GPS coordinates are read in step 76, until the calculated distance of the vehicle from the trap exceeds a predefined amount, at which point it is considered to be out of the trap's range. The IPD is turned off in step 80 and the system loops back to step 38, to get the next GPS coordinate.

Figure 7:
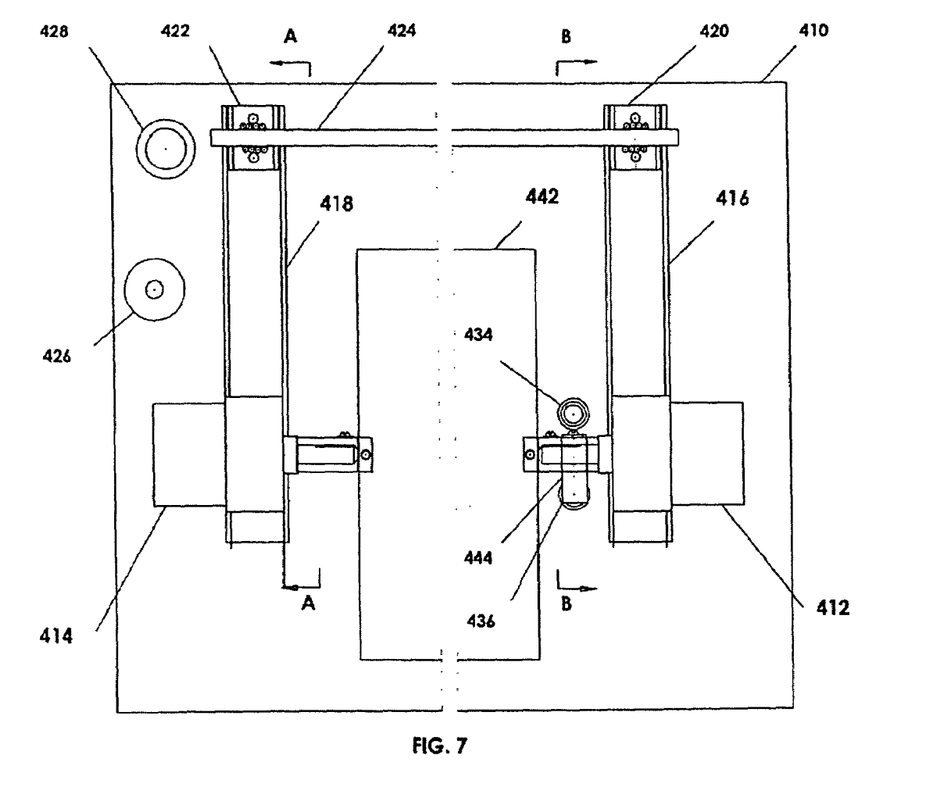
FIG. 7 a schematic block diagram of a license-plate flipper according to a preferred embodiment of the present invention.
Figure 8A:
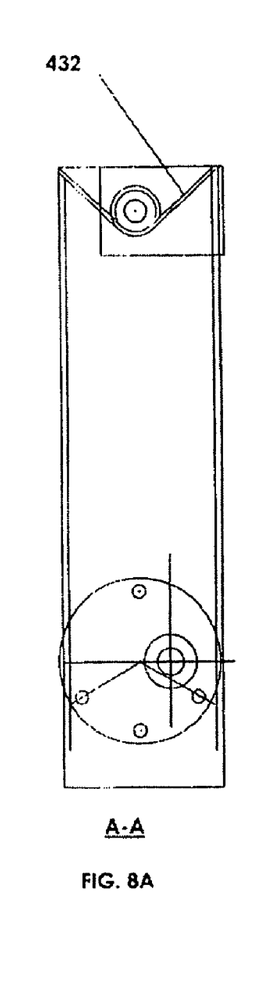
FIGS. 8A and 8B are cross sections of the license-plate flipper of FIG. 7, along section lines A—A and B—B respectively.
Figure 8B:
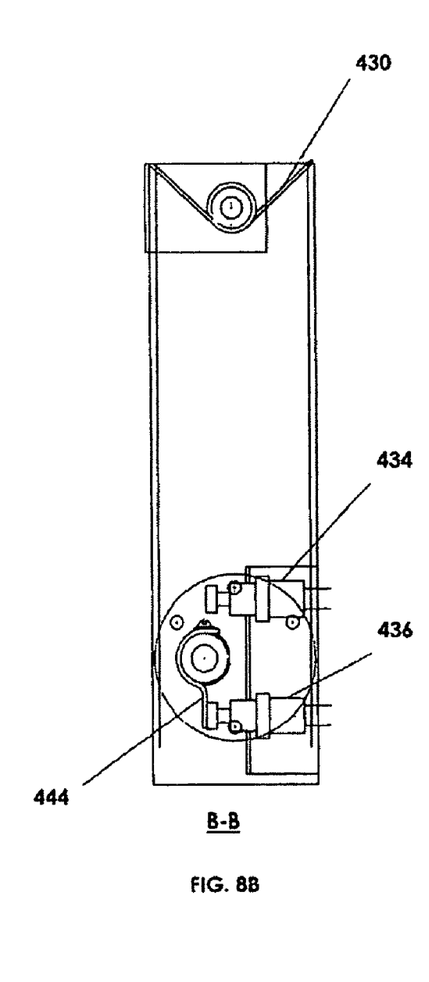

Attention is drawn now to FIG. 7—a schematic block diagram of one Identification Prevention Device (IPD) 14 according to the present invention, namely, a license plate flipper, and to FIGS. 8A and 8B, which show cross sections of the license-plate flipper of FIG. 7 along section lines A—A and B—B respectively. The license plate flipper of the present invention is designed to flip the license plate 180°, so that it faces the vehicle's body and is invisible to the outside world. The license plate flipper of the present invention, due to its unique mode of operation, may be mounted on the vehicle's front and/or back panels without the need to keep an operating distance from the vehicle's body. Namely, the flipping operation, as will be described below, requires less than a half-plate width distance between the flipper's pivot axis and the vehicle in order to perform the flipping. Thus, there is no need to cut into the vehicle's body or to install the pivot axis at a distance greater than a half-plate width from the vehicle's body. The pivot axis of the present license plate flipper may be either horizontal or vertical.

The license plate flipper comprises a back-panel 410, attached to the back and/or front of the vehicle, to which the flipping mechanism is attached. Alternatively, the mechanism may be attached directly to the car.

The flipping mechanism comprises a pair of gear motors 412, 414, such as model HN35 GBF15351 available from Hsiang Neng of Taiwan, with a capacity of up to 24V, suitable for any prevailing motor vehicle. The motors 412 and 414 are respectively connected to arms 416 and 418. Arms 416 and 418 are mounted on beams 420 and 422 respectively and are rotatable around rod 424, spanning the two beams. Beams 420 and 422 are screwed to back-panel 410. A switch 426 and a fuse 428 are also connected to the back-panel 410. Alternatively, switch 426 may be placed remotely, e.g. mounted inside the vehicle. Switch 426 is connected as a discrete IPD to Switch Controller 32, as described above. Torque springs 430 and 432 are mounted on rod 424, between arms 416, 418 and beams 420, 422 respectively. The springs are designed to pull the arms back towards back-panel 410, as will be described in detail hereinbelow.

Two adjustable micro-switches 434 and 436 are connected to arm 416 (or to arm 418), for regulating the motors' current direction and motion stopping. Motors 412, 414 have respective shafts 438, 440 which are connected to a panel 442. Panel 442 lies horizontally between the two shafts and has the vehicle's license plate (not shown) attached with its back to it, in an outwardly visible position. In an alternative embodiment, a second license plate may be attached with its back to the second side of panel 442. The second license plate may be, for example, a license plate of a different country. A leaf spring 444 is connected to the shaft 438 of motor 412 (or to shaft 440 of motor 414, depending on where the micro-switches are positioned). Leaf spring 444 is designed to alternately exert force on micro-switches 434 and 436, depending on the direction of the motors' rotation, thus causing the motors to stop rotating timingly and to alternately change their direction of rotation.

Figure 9:
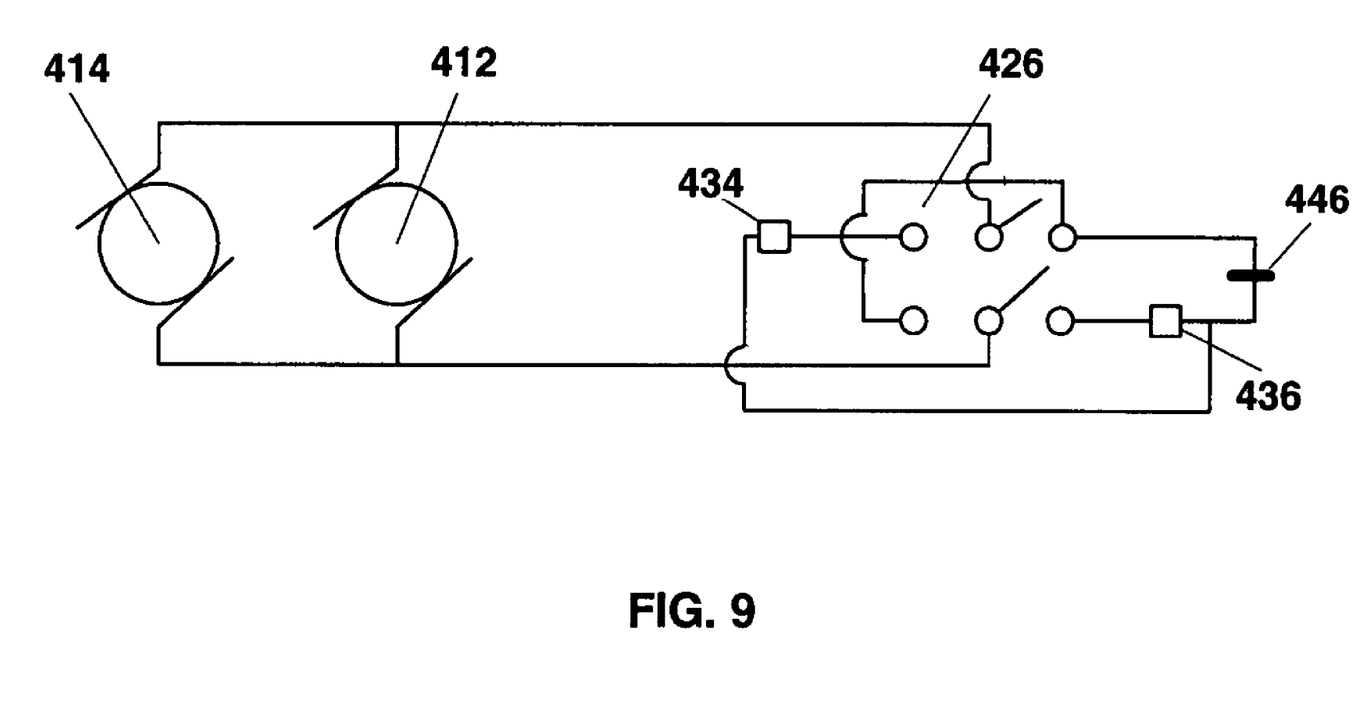
FIG. 9 is a schematic drawing of the electrical scheme of the license-plate flipper of FIG. 7.

FIG. 9 is a schematic drawing of the electrical scheme of the license-plate flipper of the present invention, additionally showing battery 446, which provides the power for the flipping system, and which may be the main battery of the vehicle.

The operation of the license-plate flipper will now be explained in detail. The operation starts by operating switch 426, as explained above with reference to the operation of IPDs. Operation of switch 426 causes current from battery 446 to rotate motor 412 (and motor 414 connected to it) in a specific direction, through the appropriate micro-switch. The rotation of the motors causes panel 442 to rotate. While rotating, panel 442 slides along back-panel 410, according to the direction of rotation. While moving, panel 442 drags arms 416 and 418, which in turn rotate around rod 424 and are lifted off back-panel 410 angularly. When the angle reaches 90°, panel 442 continues its rotation and arms 416, 418 move back towards back-panel 410 with the aid of torque springs 430, 432 respectively. Leaf spring 444, connected to the motor's shaft, rotates along with it. When the leaf spring 444 reaches, say, micro-switch 434, it causes the current of the system to be cut-off. At this time the panel 442 has completed a 180° rotation, thus exhibiting panel 442's bare side, or alternatively, the second license plate that had previously been hidden. The next operation of switch 426 will change the direction of the current supplied by battery 446, causing the motors to rotate in the opposite direction. The sequence of operations as described above will be repeated, with leaf spring 444 operating the other micro-switch.

Another example of IPD 14 is a license-plate/ID sticker cover comprising standard light scattering LCD (dispersed polymer), also called SPD (suspended particles device) glass, available from Laminated-Technologies (http://www.laminatedtechnologies.com). The SPD glass comprises millions of suspended particles placed between 2 glass or plastic panels, coated with a transparent conductive material. When a certain voltage/current, e.g. 60 Volt is applied to the suspended particles, via the conductive coating, they line-up in a straight line and allow light to flow through, moving back to a random, light-blocking pattern when the electricity is turned off.

FIG. 10 is an electrical scheme of a 12 Volt to 60–75 Volt voltage converter according to the present invention, to enable operation of the SPD glass as an IPD using the 12 Volt car battery. The same principle may be applied for converting the car battery's current to any other required current.

The invention claimed is:

1. A system for detecting and evading vehicle identification means (VIM), comprising:
   control means comprising at least one I/O channel, each said I/O channels adapted to receive or transmit one of serial data and parallel data;
   processing means connected with said control means;
   at least one VIM detector; and
   at least one identification prevention device (IPD) connected with said control means, said IPD comprising means for concealing one of a license plate number and an ID sticker in response to a signal generated from said at least one VIM detector;
   said control means adapted to automatically enable and then disable said at least one IPD selectively, according to predefined criteria.

2. The system of claim 1, additionally comprising a single-wire communication channel between said control means and said at least one VIM detector, said single-wire communication channel adapted to enable fast deployment of said at least one IPDs.

3. The system of claim 1, wherein said VIM comprises photo-radar.

4. A method of detecting and evading vehicle identification means (VIM), comprising the steps of:
   providing a VIM detection and evasion system, comprising:
   control means comprising at least one I/O channel, each said I/O channels adapted to receive or transmit one of serial data and parallel data;
   processing means connected with said control means;
   at least one VIM detector; and
   at least one identification prevention device (IPD) connected with said control means, said IPD comprising means for concealing one of a license plate number and an ID sticker; in response to a VIM identification signal generated from said at least one VIM detector
   said control means adapted to automatically enable and then disable said at least one IPD selectively, according to predefined criteria;
   receiving said VIM identification signal from said at least one VIM detector; and
   communicating said signal to said processing means.

5. The method of claim 4, additionally comprising, depending on said predefined criteria, the steps of:
   receiving a command from said processing device for activating said at least one IPD; and
   sending an ON signal to said at least one IPD.

6. The method of claim 4, wherein said VIM detection and evasion system additionally comprises a single-wire communication channel between said control means and said at least one VIM detector, said single-wire communication channel adapted to enable fast deployment of said at least one IPDs.

7. The method of claim 4, wherein said VIM comprises photo-radar.

* * * * *